United States Patent [19]

Keller et al.

[11] Patent Number: 6,028,135
[45] Date of Patent: Feb. 22, 2000

[54] PREPARATION OF AQUEOUS POLYMER DISPERSIONS OF LOW VISCOSITY WITH POLYMER VOLUME CONCENTRATIONS OF AT LEAST 50%

[75] Inventors: Peter Keller, Hirschberg; Bernhard Schuler, Mannheim; Bernd Stanger, Dudenhofen, all of Germany

[73] Assignee: BASF Aktiengesellschaft, Ludwigshafen, Germany

[21] Appl. No.: 08/877,499

[22] Filed: Jun. 17, 1997

[30] Foreign Application Priority Data

Jun. 18, 1996 [DE] Germany ............................. 196 24 280

[51] Int. Cl.⁷ ........................................................ C08K 3/20
[52] U.S. Cl. ......................... 524/458; 524/459; 524/460; 524/461; 526/201; 526/202; 526/203
[58] Field of Search .................................. 524/458, 459, 524/460, 461; 526/201–203

[56] References Cited

U.S. PATENT DOCUMENTS

| | | |
|---|---|---|
| 3,424,706 | 1/1969 | Smith et al. . |
| 4,130,523 | 12/1978 | Hoy et al. . |
| 4,409,355 | 10/1983 | Heimberg ................................ 524/458 |
| 4,456,726 | 6/1984 | Siol et al. . |
| 5,340,859 | 8/1994 | Aydin et al. . |
| 5,350,787 | 9/1994 | Aydin et al. . |
| 5,426,146 | 6/1995 | Aydin et al. . |
| 5,430,092 | 7/1995 | Aydin et al. . |
| 5,436,289 | 7/1995 | Aydin et al. . |
| 5,468,799 | 11/1995 | Aydin et al. . |
| 5,496,882 | 3/1996 | Aydin et al. . |

FOREIGN PATENT DOCUMENTS

| | | |
|---|---|---|
| 0 568 834 | 11/1993 | European Pat. Off. . |
| 31 47 008 | 6/1983 | Germany . |
| 42 13 965 | 11/1993 | Germany . |
| WO 96/11234 | 4/1996 | WIPO . |

*Primary Examiner*—Edward J. Cain
*Attorney, Agent, or Firm*—Oblon, Spivak, McClelland, Maier & Neustadt, P.C.

[57] ABSTRACT

A process for the preparation of aqueous polymer dispersions of low viscosity with polymer volume concentrations of at least 50% by volume, based on the polymer dispersion, by free-radical emulsion polymerization of ethylenically unsaturated monomers, with the exception of vinyl halides and vinylidene halides, in the presence of at least one initiator and at least one initial polymer involves emulsifying the major proportion of the monomers in an aqueous dispersion of the initial polymer and supplying this emulsion continuously to the polymerization reaction.

24 Claims, No Drawings

PREPARATION OF AQUEOUS POLYMER DISPERSIONS OF LOW VISCOSITY WITH POLYMER VOLUME CONCENTRATIONS OF AT LEAST 50%

The present invention relates to a process for preparing aqueous polymer dispersions of low viscosity with polymer volume concentrations of at least 50% by volume based on the polymer dispersion.

Owing to their property of forming polymer films when the aqueous dispersion medium is evaporated, aqueous polymer dispersions are widely employed, for example as binders for paints, as coating compositions for leather and paper, as finishes for fabric or as adhesive films.

Highly concentrated aqueous polymer dispersions have the advantages that the effort required to evaporate the aqueous dispersion medium when forming a film or when preparing polymer powders is reduced and on the other hand, a smaller transport and storage capacity is required.

A disadvantage, on the other hand, is that the viscosity of the polymer dispersions increases as their polymer content goes up. This leads to problems both in the course of preparation (dissipation of the heat of reaction) and during processing. Moreover, highly concentrated polymer dispersions of this kind have a tendency toward microcoagulation (bittiness). Because of its small size (<40 µm), microcoagulum requires much effort to remove it from the polymer dispersions and leads, in particular, to defects when a film is formed from the aqueous polymer dispersions. In this connection it is sensible to indicate the polymer content in parts by volume (% by volume=% by weight divided by polymer density), since the effects referred to are due to the packing of the polymer particles within the polymer dispersion.

It has been found that polymer dispersions having a broad size distribution of the dispersed polymer particles (polydisperse polymers) are generally of lower viscosity, for a given solids content, than those with a narrow size (monodisperse) distribution.

DE-A 31 47 008 describes a process for preparing highly concentrated aqueous polymer dispersions having a bimodal size distribution of the polymer particles, by subjecting ethylenically unsaturated monomers to emulsion polymerization in the presence of two initial polymers which differ in particle size. Although polymer dispersions with polymer contents of up to 70% by weight (≈64% by volume) are obtained in this process, the use of two different initial polymers nevertheless appears complex. Moreover, the dispersions described in the examples have viscosity levels which are too high for many practical applications.

U.S. Pat. No. 4,130,523 relates to a process for preparing aqueous polymer dispersions which involves removing the aqueous polymer dispersion, formed continually during the actual polymerization process, from the reaction zone, storing it and subsequently resupplying it to the reaction zone as a kind of initial polymer. However, this process appears to be too complex to find any large-scale industrial application.

U.S. Pat. No. 3,424,706 describes a process for preparing aqueous polymer dispersions comprising from 70 to 97% by weight of vinylidene chloride in copolymerized form by emulsion polymerization in the presence of an initial polymer. This involves metering in the major proportion of the initial polymer as a latex, and the monomers, to the reaction mixture. A disadvantage of this process is that it is restricted to monomer mixtures predominantly comprising vinylidene chloride. Moreover, only polymer volume concentrations of less than 50% by volume are obtained.

DE-A 42 13 965 describes a process for preparing highly concentrated aqueous polymer dispersions, where the monomers and initial polymer are fed continuously into the polymerization batch via separate feeds. In this process, the problem of the formation of microcoagulum (bits) is not solved to complete satisfaction.

It is an object of the present invention, therefore, to provide a process which permits the preparation of aqueous polymer dispersions having a high polymer volume concentration, a low viscosity and a reduced content of microcoagulum. Moreover, the process should be largely independent of the type of monomers used.

We have found that this object is achieved, surprisingly, by a process for the preparation of aqueous polymer dispersions of low viscosity with polymer volume concentrations of at least 50% by volume, based on the polymer dispersion, by free-radical emulsion polymerization of ethylenically unsaturated monomers, with the exception of vinyl halides and vinylidene halides, in the presence of at least one initiator and at least one initial polymer, which comprises emulsifying the major proportion of the monomers in an aqueous dispersion of the initial polymer and supplying this emulsion continuously to the polymerization reaction. The invention also relates to the polymer dispersions prepared by the novel process.

In accordance with the invention the emulsion polymerization is conducted such that the major proportion, preferably at least 80% by weight, in particular at least 90% by weight, of the monomers to be polymerized are preemulsified in an aqueous dispersion of the initial polymer (seed latex), with or without the aid of surface-active substances, and this emulsion is metered into the polymerization vessel which is at reaction temperature. In this context the amount of initial polymer, based on the monomers to be polymerized, is preferably from 0.01 to 10% by weight and, in particular, from 0.1 to 2% by weight. The ratio of water to monomer is in the range from 1:1 to 1:9 (parts by weight). To achieve this, it may be necessary to add additional water and, if required, additional surface-active substances. In a preferred embodiment the initial polymer is left to swell in the monomer emulsion before being used for—in particular, at least 30 minutes.

The reaction is preferably started by placing some of the monomers, together if desired with an initial polymer, and with water and at least some of the initiator in the reaction vessel, and heating this initial charge to reaction temperature. The emulsion of the monomer in the seed latex is then supplied to the polymerization reaction continuously, ie. at a constant feed rate or in accordance with the gradient procedure. The rate of addition is guided by the conversion in the reaction and is preferably chosen so that at least 80% by weight, in particular 90% by weight and, especially, 95% by weight of the monomers present in the reaction mixture are already copolymerized.

In a particular preferred embodiment of the novel process the feed rate of the monomeremulsion is increased continuously or stepwise to a desired value and this value, which may be determined by the conversion in the reaction (see above) or other processes in specific parameters such as batch size, heat of reaction, mixing, etc., can be maintained.

In another preferred variant of the novel process, the reaction is started by metering some of the emulsion of the monomer in the seed latex into the initial charge, which is already at reaction temperature and includes at least some of the initiator. In all cases the initial charge can include water, further emulsifier and further initial polymer, and, in particular, the latter need not necessarily be identical with the initial polymer used in the monomer emulsion.

The manner in which the initiator is metered into the emulsion polymerization is not critical. It can either be included entirely in the initial charge to the polymerization vessel or else can be added in accordance with the rate at which it is consumed in the course of the emulsion polymerization, continuously or in steps. The procedure depends both on the chemical nature of the initiator and on the polymerization temperature, and can be chosen as desired by the skilled worker.

The pressure and temperature of polymerization are likewise of rather minor importance. The latter is generally between room temperature and 100° C., preferably from 50 to 95° C. It is likewise possible to apply increased or reduced pressure, so that the polymerization temperature may even exceed 100° C. and may be up to 130° C. Highly volatile monomers, such as ethylene or butadiene, are preferably polymerized under increased pressure.

The novel process can be used to react a large number of monoethylenically unsaturated monomers. These include $C_2$–$C_6$ olefins, for example ethylene, propylene, n-butene and isobutene, vinylaromatic monomers, such as styrene, a-methylstyrene, o-chlorostyrene or vinyltoluenes, $C_1$–$C_{12}$-alkyl vinyl ethers, such as methyl, ethyl, n-propyl, isopropyl, n-butyl, isobutyl and 2-ethylhexyl vinyl ether, vinyl esters of $C_1$–$C_{18}$ monocarboxylic acids, such as vinyl acetate, vinyl propionate, vinyl butyrate, vinyl valerate, vinyl hexanoate, vinyl 2-ethylhexanoate, vinyl decanoate, vinyl laurate and vinyl stearate. Also suitable are esters of α,β-ethylenically unsaturated $C_3$–$C_{10}$ mono- or dicarboxylic acids with $C_1$–$C_{12}$-, preferably $C_1$–$C_8$-, and, in particular, $C_1$–$C_4$-alkanols. Esters of these acids with $C_5$–$C_8$-cycloalkanols can also be used. Examples of suitable $C_1$–$C_{12}$-alkanols are methanol, ethanol, n-propanol, isopropanol, 1-butanol, 2-butanol, iso- and tert-butanol, n-hexanol and 2-ethylhexanol. Examples of suitable cycloalkanols are cyclopentanol and cyclohexanol. Esters of acrylic, methacrylic, crotonic, maleic, fumaric and itaconic acid are particularly suitable. Specific examples are methyl, ethyl, n-butyl, isobutyl and 2-ethylhexyl (meth)acrylates, dimethyl maleate and di-n-butyl maleate. Other suitable monomers are nitriles of α,β-monoethylenically unsaturated carboxylic acids, such as acrylonitrile or methacrylonitrile. Moreover, $C_4$–$C_8$ conjugated dienes, such as 1,3-butadiene and isoprene, can also be employed. The abovementioned monomers normally constitute the major proportion and account for preferably from 80 to 99.9% by weight, in particular from 90 to 99.9% by weight and, especially, from 95 to 99.7% by weight of the monomers which are to be polymerized.

As modifying monomers it is preferred to copolymerize from 0.1 to 20% by weight, in particular from 0.1 to 10% by weight and, especially, from 0.3 to 5% by weight of monomers whose homopolymers are of increased water solubility. Examples of such modifying monomers are α,β-monoethylenically unsaturated mono- and dicarboxylic acids of 3 to 10 carbons, and their amides, or ethylenically unsaturated alkyl- or arylsulfonic acids. They include acrylic, methacrylic, crotonic, maleic, fumaric and itaconic acids, acrylamide and methacrylamide, and also vinylsulfonic acid, (meth)acrylamido-2-methylpropanesulfonic acid and the water-soluble salts thereof.

It is additionally possible to copolymerize monomers which enhance the strength of the polymer films formed from the polymer emulsion. These monomers are copolymerized in minor amounts, generally up to 10% by weight, preferably up to 5% by weight and, in particular, up to 1% by weight, based on the overall amount of the monomers which are to be polymerized. They are monomers including an epoxy, hydroxyl, N-alkylol or carbonyl group. Examples of such monomers are the N-hydroxyalkyl- and N-alkylolamides of α,β-monoethylenically unsaturated carboxylic acids of 3 to 10 carbons, such as 2-hydroxyethyl (meth)acrylamide and N-methylol(meth)acrylamide, the hydroxyalkylesters of the above-mentioned ethylenically unsaturated acids such as hydroxyethyl-, hydroxypropyl- and hydroxybutylacrylate and -methacrylate. Further examples are glycidylethers and glycidylesters such as vinyl-, allyl- and methallylglycidylether glycidylacrylate and glycidylmethacrylate, the diacetonylamides of the above-mentioned ethylenically unsaturated acids such as diacetonyl(meth)acrylamide, and the esters of acetylacetic acid with the above-mentioned hydroxyalkylesters of said ethylenically unsaturated acids such as acetylacetoxyethyl (meth)acrylate. Compounds containing two nonconjugated, ethylenically unsaturated bonds are also suitable, such as the diesters of dihydric alcohols with α,β-monoethylenically unsaturated $C_3$–$C_{10}$-monocarboxylic acids. Examples of such compounds are alkylene glycol diacrylates and dimethacrylates, such as ethylene glycol diacrylate, 1,3-butylene glycol diacrylate, 1,4-butylene glycol diacrylate and propylene glycol diacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate, tricyclodecenyl (meth)acrylate, N,N'-divinylimidazolin-2-one and triallyl cyanurate.

The molecular weight of the polymers can be adjusted by adding small amounts, generally from 0.01 to 5% by weight, based on the monomers to be polymerized, of one or more substances which regulate the molecular weight. Examples of these molecular weight regulators are mercapto compounds, such as mercaptoethanol, mercaptopropanol, mercaptobutanol, mercaptoacetic acid, mercaptopropionic acid, butyl mercaptan and tert-dodecyl mercaptan. Substances of this kind are preferably added to the polymerization reaction as a mixture with the monomers to be polymerized.

Surface-active substances suitable for both conducting the emulsion polymerization and preparing the monomer emulsion are the emulsifiers and protective colloids customarily employed for such purposes. The surface-active substances are usually employed in amounts of up to 10% by weight, preferably from 0.5 to 5% by weight and, in particular, from 0.5 to 3% by weight, based on the monomers to be polymerized.

Examples of suitable protective colloids are polyvinyl alcohols, cellulose derivatives and vinylpyrrolidone copolymers. A detailed description of other suitable protective colloids is given in Houben-Weyl, Methoden der organischen Chemie, Volume XIV/1, Makromolekulare Stoffe [Macromolecular Substances], Georg-Thieme-Verlag, Stuttgart, 1961, pp. 411–420. Mixtures of emulsifiers and/or protective colloids can also be used. As surface-active substances it is preferred to employ only emulsifiers, whose relative molecular weights, unlike those of the protective colloids, are normally below 2000. They may be anionic, cationic or else nonionic in nature. When using mixtures of surface-active substances the individual components must be mutually compatible, and in case of doubt this can be checked by means of a few preliminary experiments. Examples of common emulsifiers are ethoxylated mono-, di- and trialkylphenols (EO units: 3 to 50, $C_4$–$C_9$-alkyl), ethoxylated fatty alcohols (EO-units: 3 to 50, $C_8$–$C_{36}$-alkyl) and alkali metal and ammonium salts of $C_8$–$C_{12}$-alkyl sulfates, of sulfuric acid half-esters of ethoxylated $C_{12}$–$C_{18}$-alkanols (EO units: 4 to 30) and ethoxylated alkylphenols (EO units: 3 to 50, $C_4$–$C_9$-alkyl), of $C_{12}$–$C_{18}$-alkylsulfonic acids and of alkylarylsulfonic acids ($C_9$–$C_{18}$-alkyl). Further suitable emulsifiers are given in Houben-Weyl, loc. cit., pp. 192–208.

Other suitable anionic emulsifiers are bis(phenylsulfonic acid) ethers and the alkali metal and ammonium salts thereof which carry a $C_4$–$C_{24}$-alkyl on one or both aromatic rings. These compounds are part of general knowledge, known for example from U.S. Pat. No. 4,269,749, and are commercially available, for example as Dowfax® 2A1 (trademark of Dow Chemical Company).

Suitable free-radical polymerization initiators are all those capable of triggering a free-radical aqueous emulsion polymerization. They may be either peroxides, for example alkali metal peroxodisulfates, or azo compounds. Use is also made of combined systems composed of at least one organic reducing agent and at least one peroxide and/or hydroperoxide, for example tert-butyl hydroperoxide with the sodium salt of hydroxymethanesulfinic acid, or hydrogen peroxide with ascorbic acid. Also used are combined systems comprising a small amount of a metal compound which is soluble in the polymerization medium and whose metallic component can exist in a plurality of valence states, for example ascorbic acid/iron(II) sulfate/hydrogen peroxide, where ascorbic acid is frequently replaced by the sodium salt of hydroxymethanesulfinic acid, sodium sulfite, sodium hydrogen sulfite or sodium bisulfite, and hydrogen peroxide by tert-butyl hydroperoxide or alkali metal peroxodisulfates and/or ammonium peroxodisulfate. The amount of free-radical initiator system employed is preferably, based on the overall amount of monomers to be polymerized, from 0.1 to 2% by weight.

In the novel process the initial polymers are employed as dispersions. Constituent monomers of the initial polymers are suitably the monomers recommended for the free-radical aqueous emulsion polymerization in the amounts specified above.

As monomers, the initial polymers preferably comprise from 90 to 99.9% by weight, in particular from 95 to 99.7% by weight, of vinylaromatic monomers, conjugated $C_4$–$C_8$ dienes, esters of acrylic and/or methacrylic acid with $C_1$–$C_{12}$-alkanols or $C_5$–$C_8$-cycloalkanols, or mixtures thereof, and from 0.1 to 10% by weight, in particular from 0.3 to 5% by weight, of $\alpha,\beta$-unsaturated $C_3$–$C_{10}$ mono- or dicarboxylic acids, their amides, N-vinyllactams and/or mixtures thereof, in copolymerized form.

In a specific embodiment, the initial polymers used are copolymers comprising from 90 to 99.9% by weight, in particular from 95 to 99.7% by weight, of styrene, $\alpha$-methylstyrene, esters of acrylic and/or methacrylic acid with $C_1$–$C_{12}$-alkanols, butadiene or mixtures thereof, and from 0.1 to 10% by weight, in particular from 0.3 to 5% by weight, of (meth)acrylic acid, (meth)acrylonitrile, (meth)acrylamide or mixtures thereof, in copolymerized form.

The mean particle size ($d_{50}$ value, see below) of the initial polymers to be added in accordance with the invention is less than 250 nm and, preferably, is within the range from 10 to 200 nm, in particular from 10 to 100 nm and, with particular preference, from 10 to 50 nm. The solids content of such dispersions is normally in the range from 20 to 50% by weight.

It has been found advantageous if the polymer used as seed latex has a narrow particle size distribution; in other words, if the quotient $$Q = \frac{d_{90} - d_{10}}{d_{50}}$$

is <1, preferably <0.75 and particularly preferably <0.5. This $d_{50}$ value is defined as the weight average of the particle size, as determined using an analytical ultracentrifuge in accordance with the methods of W. Scholtan and H. Langen, Kolloid-Z. and Z.-Polymere 250 (1972) 782–796 (see below). The ultracentrifuge measurement gives the integral mass distribution of the particle diameter of a sample, from which it is possible to derive what percentage by weight of the particles have a diameter equal to or below a certain size. In this context, the $d_{50}$ value represents the particle size below which 50% of the particles fall, with similar comments applying to the $d_{90}$ and $d_{10}$ values.

Appropriate initial polymer dispersions are obtainable in a known manner, for example in accordance with Houben-Weyl, Methoden der organischen Chemie, Volume E20, Part I, Makromolekulare Stoffe [Macromolecular Substances], Georg-Thieme-Verlag, Stuttgart, 1987, pp. 248–268 (for further details reference is made to DE-A 42 13 965). They are prepared, for example, by mixing the aqueous phase, which may contain a basic compound such as $NaHCO_3$ or ammonia to regulate the pH, the monomers, the free-radical initiators, normally from 0.1 to 5% by weight, based on the amount of initial monomers to be polymerized, and from 1 to 50% by weight, based on the monomers to be polymerized, of surface-active substances with one another at a low temperature, then heating this mixture to polymerization temperature and carrying out polymerization. The particle size generally decreases as the amount of surface active substance is increased.

In this context, the emulsifiers, polymerization initiators and molecular weight regulators are subject to the statements made above regarding the emulsion polymerization. The monomer, regulator and initiator composition for the aqueous dispersion of the initial polymer, however, need not necessarily be identical with the composition used to prepare the final polymer.

The process of invention may usually (but not absolutely) comprise a process for removal of residual monomers (chemical and/or physical desodorizing) following the polymerization reaction. From EP-A 584 458 it is for example known to reduce the residual monomer content of the polymer dispersions by stripping with steam; EP-A 327 006 suggests conventional destination procedures (physical desodorizing). Chemical desodorizing preferably comprises a second polymerization procedure which follows the main polymerization reaction. Such procedures are e.g. described in DE-A 38 34 734, EP-A 379 892, EP-A 327 006, DE-A 44 19 518, DE-A 44 35 422 and DE-A 44 35 423, the disclosures of which are incorporated herein by reference.

The novel polymerization process is suitable for preparing polymer dispersions having polymer volume contents of at least 50% by volume, preferably at least 65% by volume. Their viscosity is generally less than 1000 mPa•s, preferably less than 750 mPa•s, especially less than 500 mPa•s (DIN 53019, 23° C.). The process can be applied with satisfactory reproducibility to the preparation of polymer dispersions having solids volume concentrations of up to 75% by volume in an industrially practicable manner. Moreover, the resulting dispersions are of only low viscosity and show no tendency to form microcoagulum.

The novel process is preferably suitable for preparing polymer dispersions whose principal constituent comprises at least one of the above-mentioned esters of acrylic or methacrylic acid, styrene, butadiene or mixtures thereof. The polymers involved are, in particular, those comprising from 70 to 100% by weight of esters of acrylic and/or methacrylic acid with $C_1$–$C_{12}$-alkanols, styrene or mixtures thereof, or from 70 to 100% by weight of styrene, butadiene or mixtures thereof in copolymerized form.

With particular preference, the process is suitable for preparing polymer dispersions in which the polymer particles comprise:

from 95 to 99.7% by weight of at least one ester of acrylic and/or methacrylic acid with $C_1$–$C_{12}$-alkanols, from 0.3 to 5% by weight of acrylic acid and/or methacrylic acid, and from 0 to 1% by weight of acrylamide and/or methacrylamide in copolymerized form.

The final polymer dispersions obtainable in accordance with the invention are particularly suitable as binders, for example for brushable paints or thin adhesive films, for the finishing of paper, leather, woven or nonwoven fabrics, or as compositions for preparing coatings and adhesive bonds, it being possible for such compositions conventionally to include additional substances, such as film formation auxiliaries, fillers and plasticizers.

EXAMPLES

1. Determination of the particle size and particle number of the polymer particles in the polymer dispersion and of the viscosity and bittiness rating The particle size distribution of the polymer particles was determined by means of the coupling PSD technique using an analytical ultracentrifuge (see W. Machtle, Angewandte Makromolekulare Chemie, 162 (1988) 35–42 (No. 2735)).

The concentration of the polymer particles in the polymer dispersion was likewise determined using an analytical ultracentrifuge, by way of the mean particle diameter, in accordance with W. Mächtle, Makromolekulare Chemie 185, (1984) 1025–1039 (and see DE 42 13 965.1).

The viscosity of the resulting polymer dispersions was determined dynamically at 23° C. with a velocity gradient of 487 $s^{-1}$ in accordance with DIN 53019.

The bittiness rating describes the proportion of microcoagulum in the polymer dispersion. For this purpose, a defined quantity of polymer dispersion is applied to a transparent test surface in a coat thickness of 60 μm, and after drying is subjected to visual comparison with appropriate reference samples.

| Bittiness rating | Observation |
|---|---|
| 1 | no visible bits |
| 2 | isolated bits |
| 3 | a few bits |
| 4 | many bits |
| 5 | very many bits |

2. Preparation of aqueous dispersions DA1 and DA2 of an initial polymer

DA1: A solution of 0.0625 kg of ascorbic acid and 0.005 kg of iron(II) sulfate in 2 kg of water was first of all stirred at room temperature into a mixture of

| | |
|---|---|
| 65.4 kg | of water, |
| 25 kg | of n-butyl acrylate and |
| 22.25 kg | of a 45% strength by weight aqueous solution of the surface-active substance corresponding to Dowfax ® 2A1 | and then a mixture of 2 kg of water and 0.65 kg of 30% strength by weight aqueous hydrogen peroxide solution was added over the course of 3 minutes. The mixture was subsequently cooled, a mixture of 0.05 kg of ascorbic acid in 1 kg of water was added, and then the batch was stirred for 2 hours.

The aqueous dispersion thus obtainable of an initial polymer had a solids content of 30.2% by weight, a weight-average particle diameter $\bar{d}_w$ of 32 nm and a particle concentration of $1.7 \cdot 10^{19}$ particles/kg.

DA2: A mixture of

| | |
|---|---|
| 1800 g | of water, |
| 225 g | of a 45% strength by weight aqueous solution of the surface-active substance corresponding to Dowfax ® 2A1, |
| 10 g | of a 25% strength by weight aqueous ammonia solution, |
| 495 g | of n-butyl acrylate and |
| 5 g | of acrylic acid | was heated to 80° C., and 25 g of sodium peroxodisulfate were added in one portion. The mixture was then held at 80° C. for 1 hour before being cooled to 25° C.

The aqueous dispersion thus obtainable of an initial polymer had a solids content of 26% by weight, a weight-average particle diameter $\bar{d}_w$ of 35 nm and a particle concentration of $1.1 \cdot 10^{19}$ particle/kg.

3. Preparation of different novel aqueous final polymer dispersions DE1 to DE4

DE1: A mixture, initially charged to a polymerization vessel, of

| | |
|---|---|
| 150 g | of water, |
| 22 g | of a 20% strength by weight aqueous solution of the surface-active substance corresponding to Dowfax ® 2A1, |
| and 11 g | of aqueous dispersion DA1 from 1) | was heated with stirring to 85° C. The feed stream II was then added continuously over the course of 5 hours while maintaining the temperature of 85° C. Concurrently with feed stream II, feed stream I was added continuously in accordance with the following program:

| | |
|---|---|
| | 4% by weight over the course of 40 min, |
| then | 8% by weight over the course of 40 min, |
| then | 88% by weight over the course of 200 min. |

After the end of the addition of feed stream II, the reaction mixture was held at 85° C. for one hour more.

Feed stream I:

| | |
|---|---|
| 549 g | of aqueous dispersion DA1 |
| 1345 g | of n-butyl acrylate |
| 889 g | of methyl methacrylate |
| 46.5 g | of methacrylic acid |

Feed stream II:

| | |
|---|---|
| 160 g | of water |
| 10 g | of sodium peroxodisulfate |

The resulting dispersion was free from microcoagulum and had a solids volume concentration of 67.8% by volume, and a viscosity of 440 mPa•s. The bittiness rating was 1.

DE2: A mixture of

| | |
|---|---|
| 160 g | of water, |
| 11.2 g | of a 20% strength aqueous solution of the surface-active substance corresponding to Dowfax ® 2A1, and |
| 11 g | of aqueous dispersion DA1 from 1) | was charged to a polymerization vessel and heated with stirring to 85° C. While maintaining this temperature, feed stream II was added continuously over the course of 5 hours. Concurrently with feed stream II, feed stream I was added continuously in accordance with the following program:

4% by weight over the course of 40 min,
8% by weight over the course of 40 min,
88% by weight over the course of 200 min.

After the end of the addition of the feed stream II, the reaction mixture was held at 85° C. for one hour more.

Feed stream I:

| | |
|---|---|
| 549 g | of aqueous dispersion DA1 from 1), |
| 915.2 g | of n-butyl acrylate, |
| 114 g | of ethyl acrylate, |
| 114 g | of 2-ethylhexyl acrylate, |
| 114 g | of methyl methacrylate, |
| 22.8 g | of acrylic acid, |
| 3.4 g | of tert-dodecyl mercaptan. |

Feed stream II:

| | |
|---|---|
| 160 g | of water, |
| 10 g | of sodium peroxodisulfate. |

The resulting dispersion was free from microcoagulum and had a solids volume concentration of 69.0% by volume and a viscosity of 360 mPa•s. The bittiness rating was 1.

DE3: 175 g of water were charged to a polymerization vessel and heated to 85° C. Then, while maintaining this temperature, the following feed streams I and II were added, beginning their addition simultaneously and proceeding in accordance with the following program:

Feed stream I:

667 g of aqueous dispersion DA2 from 1),
2257.2 g of n-butyl acrylate,
22.8 g of acrylic acid.
2% by weight in 20 minutes,
4% by weight in 20 minutes,
8% by weight in 20 minutes,
86% by weight in 180 minutes.

Feed stream II:
79.7 g of water,
6.0 g of sodium peroxodisulfate.
20% by weight in 5 minutes,
80% by weight in 115 minutes.

After the end of feed stream II, the reaction mixture was held at 85° C. for one hour more and then cooled.

The resulting dispersion was virtually free from microcoagulum and had a solids volume concentration of 70.0% by volume and a viscosity of 450 mPa•s. The bittiness rating was 1–2.

DE4: Like DE3, but with the feed streams following the program below:

Feed stream I:
1% by weight in 20 minutes,
2% by weight in 20 minutes,
4% by weight in 20 minutes,
93% by weight in 300 minutes.

Feed stream II:
5% by weight in 60 minutes,
5% by weight in 60 minutes,
90% by weight in 240 minutes, The resulting dispersion was substantially free from microcoagulum and had a solids volume concentration of 70.0% by volume and a viscosity of 500 mPa•s. The bittiness rating was 2.

Preparation of the comparison dispersions VDE1 to VDE4

VDE1 The procedure as for DE1 was followed but the seed dispersion DA1 and the monomers were added by way of separate feeds. The feed of the seed was started 80 minutes after beginning the addition of monomer (feed stream I from DE1 without seed) in accordance with the following program:

33.4% by weight over the course of 40 minutes,
66.6% by weight over the course of 120 minutes.

Solids volume concentration: 67.6% by volume
Viscosity: 460 mPa•s
Bittiness rating: 4–5

VDE2 The procedure as for DE2 was followed but the seed dispersion and the monomers were added by way of separate feeds. The feed of the seed was started 80 minutes after beginning the addition of monomer (feed stream I from DE2 without seed) in accordance with the following program:

26% by weight over the course of 80 minutes,
54% by weight over the course of 60 minutes,
20% by weight over the course of 60 minutes.

| | |
|---|---|
| Solids volume concentration: | 69.4% by volume |
| Viscosity: | 375 mPa · s |
| Bittiness rating: | 4 |

VDE3 The procedure as for DE3 was followed but the seed dispersion DA2 was supplied to the polymerization reaction by way of a separate feed, beginning simultaneously with the addition of monomer (feed stream I from DE3 without seed). The feed of the seed was as follows:

5% by weight in 60 minutes,
10% by weight in 60 minutes,
85% by weight in 120 minutes.

| | |
|---|---|
| Solids volume concentration: | 69.5% by volume |
| Viscosity: | 430 mPa · s |
| Bittiness rating: | 3–4 |

VDE4 The procedure of VDE3 was followed. The addition of the seed dispersion was as follows:

1% by weight in 5 minutes,
99% by weight in 295 minutes.

| | |
|---|---|
| Solids volume concentration: | 70.3% by volume |
| Viscosity: | 510 mpa · s |
| Bittiness rating: | 4 |

We claim:

1. A process for the preparation of aqueous polymer dispersions of low viscosity with polymer volume concentrations of at least 50% by volume, based on the polymer dispersion, by free-radically emulsion polymerizing ethylenically unsaturated monomers, with the exception of vinyl halides and vinylidene halides, in the presence of at least one initiator and at least one initial polymer, which comprises emulsifying a major proportion of the monomers in an aqueous dispersion of the initial polymer, and metering this emulsion continuously to the polymerization reaction.

2. The process of claim 1, wherein from 0.01 to 10% by weight of initial polymer is used, based on the monomers to be polymerized.

3. The process of claim 1, wherein the mean particle diameter ($d_{50}$ value) of the initial polymer is less than 250 mm.

4. The process of claim 1, wherein the initial polymers used comprise at least one copolymer comprising from 90 to 99.9% by weight of vinyl aromatic monomers, conjugated $C_4$–$C_8$ dienes, esters of acrylic or methacrylic acid with $C_1$–$C_{12}$-alkanols or $C_5$–$C_8$-cycloalkanols, or mixtures thereof, and from 0.1 to 10% by weight of $\alpha,\beta$-unsaturated $C_3$–$C_{10}$ mono- or dicarboxylic acids, their amides, N-vinyllactams or mixtures thereof, in copolymerized form, the proportions by weight being based in each case on the overall weight of the polymer.

5. The process of claim 4, wherein the initial polymer used comprises at least one copolymer comprising from 90 to 99.9% by weight of styrene, a-methylstyrene, esters of acrylic or methacrylic acid as a mixture thereof, with C1–$C_{12}$-alkanols, butadienes or mixtures thereof, and from 0.1 to 10% by weight of (meth)acrylic acid, (meth)acrylonitrile, (meth)acrylamide or mixtures thereof, in copolymerized form.

6. The process of claim 1, wherein the initial polymer is left to swell in the monomer emulsion for at least 30 minutes before being added to the reaction mixture.

7. The process of claim 1, wherein the ethylenically unsaturated monomers used comprise from 80 to 99.9% by weight of at least one monomer selected from the group consisting of esters of $\alpha,\beta$-unsaturated $C_3$–$C_{10}$ mono- or dicarboxylic acids with $C_1$–$C_{12}$-alkanols or $C_5$C-cycloalkanols, vinyl esters of $C_1$–$C_{18}$ carboxylic acids, $C_1$–$C_{12}$-alkyl vinyl ethers, $C_2$–$C_6$-alkyl vinyl ethers, $C_2$–$C_6$ olefins, vinyl aromatic monomers, conjugated $C_4$–$C_8$ dienes, (meth)acrylonitrile or mixtures thereof, and from 0.1 to 20% by weight of $\alpha,\beta$-monoethylenically unsaturated mono- or dicarboxylic acids of 3 to 10 carbons, their amides, vinylsulfonic acid (meth) acrylamido-2-methylpropane-sulfonic acid or salts thereof or a mixture thereof, N-vinylpyrrolidone or mixtures thereof, and from 0 to 10% by weight of crosslinking monomers the portions by weight being based in each case on the total amount of monomer to be polymerized.

8. The process of claim 1, wherein the quantitative ratio of water to monomer in te monomer emulsion is within the range of from 1:1 to 1:0.

9. The process of claim 1, wherein the monomer emulsion is metered in such that the rate of conversion of the monomers present in the reaction mixture is at least 80%.

10. The process of claim 3, wherein the mean particle diameter of the initial polymers is from 10 to 200 nm.

11. The process of claim 10, wherein the mean particle diameter of the initial polymer is from 10 to 100 nm.

12. The process of claim 11, wherein the mean particle diameter of the initial polymer is from 10 to 50 nm.

13. The process of claim 3, wherein the initial polymer has a narrow particle size distribution, such that:

$$Q < 1,$$

$$\text{wherein: } Q = \frac{d_{90} - d_{10}}{d_{50}}$$

wherein:

$d_{50}$ is a weight average of particle size, below which 50% of particles fall, and $d_{90}$ and $d_{10}$ are weight averages of particle size, below which 90% and 10%, respectively, of particles fall, said $d_{50}$, $d_{90}$ and $d_{10}$ values being determined by analytical ultracentrifuge.

14. An aqueous polymer dispersion obtained by the process of claim 1.

15. The aqueous polymer dispersion of claim 14, having a polymer volume content of >65% by volume.

16. The aqueous polymer dispersion of claim 14, having a viscosity of <1000 mPa•s.

17. The aqueous polymer dispersion of claim 14, wherein the polymer particles comprise from 70 to 100% by weight of esters of acrylic or methacrylic acid with $C_1$–$C_{12}$-alkanols, styrene or mixtures thereof, or from 70 to 100% by weight of styrene, butadiene or mixtures thereof in copolymerized form.

18. The aqueous polymer dispersion of claim 1, wherein the polymer particles comprise from 95 to 99.9% by weight of at least one ester of acrylic methacrylic acid with $_{C}$-$_{B12}$-alkanols, from 0.3 to 5% by weight of acrylic acid or methacrylic acid or a mixture thereof, and from 0 to 1% by weight of acrylamide or methacrylamide or a mixture thereof in copolymerized form.

19. A coating composition, comprising as a binder the aqueous polymer dispersion of claim 14.

20. An adhesive composition, containing at least one of the aqueous polymer dispersions of claim 14.

21. A method of treating or finishing paper, leather or woven or nonwoven fabrics, which comprises treating or finishing said paper, leather or woven or nonwoven fabrics with the aqueous polymer dispersion of claim 14.

22. The process of claim 1, wherein at least 80% by weight of the monomers to be polymerized are preemulsified in an aqueous dispersion of the initial polymer.

23. The process of claim 1, wherein the ratio of water to monomers in the emulsion of the monomers is in the range from 1:1 to 9:1.

24. The process of claim 1, wherein the initial polymer in the monomer emulsion at least 30 minutes before being used.

* * * * *

UNITED STATES PATENT AND TRADEMARK OFFICE
CERTIFICATE OF CORRECTION

PATENT NO. : 6,028,135
DATED : February 22, 2000
INVENTOR(S): Peter KELLER, ET AL.

It is certified that an error appears in the above-identified patent and that said Letters Patent is hereby corrected as shown below:

Column 12, lines 1-2 "$C_5C$-cycloalkanols," should read --$C_5$-$C_8$-cycloalkanols,--.

Signed and Sealed this

Eighth Day of May, 2001

Attest:

NICHOLAS P. GODICI

Attesting Officer

Acting Director of the United States Patent and Trademark Office